(12) United States Patent
Novak et al.

(10) Patent No.: US 11,073,207 B2
(45) Date of Patent: Jul. 27, 2021

(54) METHOD FOR OPERATING A PARKING LOCK DEVICE BY MEANS OF A HYDRAULIC SYSTEM

(71) Applicant: ZF Friedrichshafen AG, Friedrichshafen (DE)

(72) Inventors: Rainer Novak, Bregenz (AT); Markus Terwart, Thundorf (DE); Andreas Roedler, Taufkirchen (DE); Alexander Hoffmann, Lebach (DE); Andreas Feiner, Isny (DE); Tobias Pfleger, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 424 days.

(21) Appl. No.: 16/095,186

(22) PCT Filed: Mar. 20, 2017

(86) PCT No.: PCT/EP2017/056474
§ 371 (c)(1),
(2) Date: Oct. 19, 2018

(87) PCT Pub. No.: WO2017/182207
PCT Pub. Date: Oct. 26, 2017

(65) Prior Publication Data
US 2019/0145512 A1    May 16, 2019

(30) Foreign Application Priority Data
Apr. 19, 2016   (DE) .................... 10 2016 206 561.0

(51) Int. Cl.
*F16H 61/00*   (2006.01)
*F16H 63/34*   (2006.01)
(Continued)

(52) U.S. Cl.
CPC ......... *F16H 61/0031* (2013.01); *F16H 61/12* (2013.01); *F16H 63/3483* (2013.01); *F16H 63/483* (2013.01)

(58) Field of Classification Search
CPC combination set(s) only.
See application file for complete search history.

(56) References Cited

U.S. PATENT DOCUMENTS 8,070,636 B2* 12/2011 Gierer ................. F16H 61/0206
                                                475/119
8,167,105 B2*  5/2012 Herrmann ............... F16H 61/12
                                                192/48.601
(Continued)

FOREIGN PATENT DOCUMENTS

DE    102011105380 A1   12/2011
DE    102010043259 A1    5/2012
(Continued)

OTHER PUBLICATIONS

German Search Report DE102016206561.0 dated Jul. 26, 2017. (8 pages).

(Continued)

*Primary Examiner* — Charles A Fox
*Assistant Examiner* — Ryan P Dodd
(74) *Attorney, Agent, or Firm* — Dority & Manning, P.A.

(57) ABSTRACT

A method for operating a parking lock device (21) with a hydraulic system (1), the method including, when there is a demand to engage the parking lock device (21) originating from a disengaged operating condition of the parking lock device (21), applying a pilot pressure (p_EDS4) at the parking lock valve (PSV) and applying the main pressure (p_sys) at the parking lock valve (PSV), if necessary, via the positioning valve (POSV). The pilot pressure (p_EDS4) and the main pressure (p_sys) are each guided to defined pressure levels at which the parking lock valve (PSV) is trans- (Continued)

ferrable into the further operating condition range of the parking lock valve (PSV) by the active actuating force against the pilot pressure (p_EDS4) and against the pressure between the parking lock valve (PSV) and the parking lock cylinder (23).

16 Claims, 10 Drawing Sheets

(51) Int. Cl.
  *F16H 61/12* (2010.01)
  *F16H 63/48* (2006.01)

(56) References Cited

U.S. PATENT DOCUMENTS

| | | | |
|---|---|---|---|
| 8,915,344 B2* | 12/2014 | Schuller | F16D 48/0206 |
| | | | 192/3.58 |
| 9,103,435 B2* | 8/2015 | Schmidt | F16H 61/0206 |
| 9,890,850 B2* | 2/2018 | Novak | F16H 61/0031 |
| 2015/0135876 A1 | 5/2015 | Novak | |

FOREIGN PATENT DOCUMENTS

| | | |
|---|---|---|
| DE | 102011083963 A1 | 5/2012 |
| DE | 102011109377 A1 | 2/2013 |
| DE | 102013222984 A1 | 5/2015 |
| WO | WO 2012/062259 | 5/2012 |
| WO | WO 2013/017202 | 2/2013 |

OTHER PUBLICATIONS

International Search Report (English Translation) PCT/EP2017/056474, dated Jun. 20, 2017. (3 pages).

* cited by examiner

METHOD FOR OPERATING A PARKING LOCK DEVICE BY MEANS OF A HYDRAULIC SYSTEM

FIELD OF THE INVENTION

The invention relates generally to a method for operating a parking lock device with a hydraulic system.

BACKGROUND

DE 10 2013 222 984 A1 describes a transmission device having a hydraulic system including a pump device. The transmission device is a dual clutch transmission. A first pump unit of the pump device is a variable displacement sliding vane pump, while a second pump unit of the pump device is a fixed displacement pump.

In this case, the first pump unit is the main gear pump which is coupled, in a way known per se, to a transmission input shaft (not represented in greater detail in the drawing) and, therefore, is drivable by a drive machine which is connectable to the transmission input shaft of the transmission device. In contrast thereto, the second pump unit is coupled to the transmission output shaft which, in turn, is connectable, in a way known per se, to a driven end of a vehicle drive train including the transmission device and, at vehicle speeds greater than zero, is driven at an input speed corresponding to an output speed. A pressure side of the first pump unit is connected to a primary pressure circuit of the hydraulic system, in which a system pressure or a main pressure prevails, which, in turn, is adjustable via a pilot-controllable system pressure valve.

A hydraulic supply of associated actuators takes place, according to demand, via the first pump unit. In this way, for example, clutch valves associated with the two clutches of a dual clutch system of the transmission device as well as a parking lock system are supplied with hydraulic fluid originating from the primary pressure circuit or from the first pump. The second pump unit is associated with a further pressure circuit which is a separate low pressure circuit, and supplies a lubricating spider of a gear set and, moreover, an all-wheel clutch, which is a hang-on clutch, cooling.

The parking lock system or the parking lock device of the transmission device includes a parking lock valve which is pilot-controllable against an actuating force of a spring device and at which the main pressure is applicable in a defined operating condition range of a positioning valve. The positioning valve is pilot-controllable against an actuating force of a spring device via a pilot control. A pressure chamber of a parking lock cylinder is pressurized with the main pressure of the primary pressure circuit, via the parking lock valve, in a defined operating condition range of the parking lock valve to disengage the parking lock device or to hydraulically hold the parking lock device in the disengaged condition, while, in a further operating condition range of the parking lock valve, the pressure chamber is connected to a non-pressurized area via the parking lock valve and the parking lock device is transferrable into its engaged operating condition.

Disadvantageously, so-called single-point failures in the area of the parking lock valve and/or the positioning valve during unfavorable operating condition progressions of the hydraulic system cause unintentional actuations of the parking lock system or prevent demanded operating condition changes of the parking lock device, which is undesirable, however, and adversely affects vehicle availability.

In this case, a so-called single point failure of the parking lock valve or of the positioning valve is understood to mean operating conditions in which the parking lock valve or the positioning valve cannot be actuated by the active actuating force to the demanded extent, due to jammed operating conditions or due to faulty pressure regulators.

The problem addressed by the present invention is that of providing a method for operating a parking lock device with a hydraulic system, by which an engagement of the parking lock device is carried out in a simple way.

SUMMARY OF THE INVENTION

In the method according to the invention for operating a parking lock device with a hydraulic system, the hydraulic system includes a parking lock valve which is pilot-controllable against an actuating force and at which a main pressure is applicable, in a defined operating condition range of the positioning valve which is pilot-controllable against an actuating force via a pilot control. A pressure chamber of a parking lock cylinder is pressurized with the main pressure, via the parking lock valve, in a defined operating condition range of the parking lock valve to disengage the parking lock device or hydraulically hold the parking lock device in the disengaged condition. In a further operating condition range of the parking lock valve, the pressure chamber is connected to a non-pressurized area via the parking lock valve and the parking lock device is engageable. When there is a demand to engage the parking lock device originating from a disengaged operating condition of the parking lock device, the pilot pressure applied at the parking lock valve as well as the main pressure applied at the parking lock valve, if necessary, are each guided via the positioning valve to defined pressure levels at which the parking lock valve is transferrable into its further operating condition range by the active actuating force against the pilot pressure and against the pressure between the parking lock valve and the parking lock cylinder.

Through the approach according to the invention, the parking lock device is engageable to the desired extent in the case of a detected single point failure in the area of the positioning valve, since, by lowering the main pressure, the self-retain function of the parking lock valve is deactivated and the parking lock valve is transferrable into its further operating condition range by the actuating force.

If, when there is a demand to engage the parking lock device originating from a disengaged operating condition of the parking lock device, the pilot pressure of the pilot control is applied at the positioning valve opposing the actuating force, the delivery of the main pressure in the direction of the parking lock valve and, therefore, of the parking lock cylinder, is simply disconnected in the area of the positioning valve, whereby the self-retain function of the parking lock valve is deactivated and the parking lock cylinder is vented via the parking lock valve in order to engage the parking lock.

If the pressure between the parking lock valve and the pressure chamber is additionally applied at the parking lock valve as control pressure opposing the actuating force, when there is a demand to disengage the parking lock device, the pilot pressure is applied at the parking lock valve against the active actuating force when it is detected that the pressure between the parking lock valve and the pressure chamber of the parking lock valve is less than a threshold value at which the parking lock valve is transferred by the actuating force into a further operating condition range, while the pilot pressure applied at the positioning valve is adjusted to a pressure level at which the positioning valve is transferred via this actuating force into its defined operating condition range or is held in its defined operating condition range.

Through this variant of the approach according to the invention, a self-retain function of the parking lock valve is activated when the main pressure is reduced and the main pressure is applied at the parking lock cylinder to the desired extent, to enable the parking lock device to be securely held in the disengaged condition during defined operating condition progressions of the hydraulic system. For this purpose, the parking lock valve is activated, via the pilot pressure, against the active actuating force in that the main pressure applied at the parking lock valve via the positioning valve is further delivered via the parking lock valve in the direction of the parking lock cylinder and the parking lock is held in the disengaged operating condition.

In one advantageous variant of the method according to the invention, when there is a demand to disengage the parking lock device and there is an operating condition of a first pressure medium source, in which the displacement volume of the first pressure medium source and the main pressure made available by the first pressure medium source are at least approximately zero, and an operating condition of a second pressure medium source, in which the flow rate of the second pressure medium source and a main pressure made available by the second pressure medium source are greater than zero, the parking lock device is pressurized with hydraulic pressure in the direction of its disengaged operating condition such that the pilot-controllable valve device associated with the second pressure medium source is appropriately pilot-controlled in order to adjust a main pressure, wherein the parking lock valve is actuated by the main pressure and/or by the pilot pressure in the direction of its defined operating condition range.

By this approach, the hydraulic control unit or the hydraulic system is supplied with hydraulic fluid via the second pressure medium source as usual, for example, during a sailing operating condition while the drive machine is simultaneously connected, during which the first pressure medium source delivers no flow. By an appropriate pilot control of the pilot-controllable valve device associated with the second pressure medium source, a main pressure is preferably adjusted, which is greater than the holding pressure of the parking lock valve. It is therefore ensured that the parking lock valve is transferred into its defined operating condition range even when the drive machine is switched off, in order to then hydraulically hold the parking lock device in the disengaged operating condition with the aid of the main pressure which is then applied via the parking lock valve.

The parking lock device is transferrable into its engaged operating condition with a high level of spontaneity when the main pressure and the pilot pressure applied at the parking lock valve are guided to the defined pressure levels upon detection of a single point failure of the positioning valve.

If the main pressure and the pilot pressure applied at the parking lock valve are guided to the defined pressure levels when there is an active actuation of a drive clutch of an automatic transmission, which is pressurized with main pressure via the positioning valve, an abrupt disconnection of the drive clutch from the main pressure supply as well as an adverse effect on a ride comfort are avoidable.

If, when there is a demand to engage the parking lock device, the parking lock device is held in the engaged operating condition or is transferred into the engaged operating condition in that the pilot pressure acting in the direction of the further operating condition range of the positioning valve and against the actuating force is applied at the positioning valve, while an actuation of the parking lock valve by the pilot pressure as well as by the pressure between the parking lock valve and the pressure chamber of the parking lock cylinder against the actuating force in the direction of the further operating condition range of the parking lock valve does not occur, the parking lock device is held in its engaged operating condition or is transferred into its engaged operating condition to the desired extent if a single point failure occurs in the area of the parking lock valve or in the area of the positioning valve.

In one advantageous variant of the method according to the invention, when there is a demand to engage the parking lock device originating from a disengaged operating condition of the parking lock device, the engagement time of the parking lock device is determined, wherein, upon ascertainment of an engagement time greater than a defined time period, a fault is detected in the area of the parking lock valve. Therefore, a suitable activation sequence for the positioning valve is foreseeable, for example, during a restart of a drive machine, in order to transfer the parking lock device into its engaged operating condition or into its disengaged operating condition to the demanded extent, or to hold the parking lock device in said operating condition.

If, when there is a demand to engage the parking lock device, a parking lock sensor is monitoredby which an operating condition of the parking lock device is determined, wherein a malfunction of the parking lock valve is ascertained upon detection of an operating condition change in the direction of the disengaged operating condition of the parking lock device, an engine start phase is monitored in a simple way in a rotational speed range below an idling speed of the drive machine, for example, and, upon occurrence of a malfunction in the area of the parking lock device, an immediate fault entry is carried out in a simple way while a driver is simultaneously informed.

A vehicle availability is easily increasable by actuating the positioning valve upon application of the maximum pilot pressure of the pilot control at the positioning valve upon detection of a fault in the area of a pressure regulator in which the pilot pressure of the positioning valve is adjustable by appropriately applying a further pilot pressure against the pilot pressure of the pilot control in the direction of its further operating condition range.

If there is a demand to disengage the parking lock device, the parking lock device is held in the disengaged operating condition via a stop device. The stop device is deactivated when there is a demand to engage a parking lock device. The parking lock device itself is securely stopped in the disengaged operating condition in the event of failure of the hydraulic self-retain of the parking lock device and is transferrable into its engaged operating condition with little effort.

In one advantageous variant of the method according to the invention, upon detection of a malfunction of the stop device, the main pressure is adjusted to or held at a pressure level greater than a threshold, at which the parking lock device is transferrable into the disengaged operating condition or is held in the disengaged operating condition with the aid of the main pressure.

In one further advantageous variant of the method according to the invention, the main pressure is continuously ascertained. During operating condition progressions of the hydraulic system, in which the main pressure increases from a pressure level of at least approximately zero in the direction of a pressure level at which the parking lock device is held in the disengaged operating condition by the main pressure, the parking lock valve and the positioning valve are actuated to an extent required to pressurize the pressure chamber of the parking lock cylinder with the main pressure when there is a demand to disengage the parking lock device or to hold the parking lock device in the disengaged operating condition. Therefore, it is ensured in a simple way that operating condition progressions, during which no main pressure is available, are detected via an appropriate monitoring function. As soon as a main pressure required for the hydraulic self-retain of the parking lock device is present again, an immediate reactivation of the hydraulic self-retain of the parking lock device is carried out to enable the parking lock device to be hydraulically held in the disengaged operating condition.

The actuation of the parking lock valve and of the positioning valve required for pressurizing the pressure chamber of the parking lock cylinder with main pressure is interrupted or does not occur when there is a demand to pressurize further hydraulic consumers with the main pressure when the supply of these further hydraulic consumers with main pressure is assigned a higher priority than pressurizing the pressure chamber of the parking lock device with main pressure. It is therefore ensured, in a simple way, that more highly prioritized functions of the automatic transmission, such as a gear selection or filling processes of clutches, are implemented as required and are not adversely affected by the build-up of the hydraulic self-retain of the parking lock device.

In one advantageous variant of the method according to the invention, the operating conditions of the pressure regulators provided for adjusting the pilot pressure of the pilot control of the positioning valve and the pilot pressure of the parking lock valve are monitored. A time monitoring is started upon ascertainment of operating conditions of the pressure regulators, which allow for a drop of the pressure in the pressure chamber of the parking lock cylinder to a pressure level at which the parking lock device is transferrable into its engaged operating condition and when there is a demand to disengage the parking lock device. The pressure regulators are each transferred into an operating condition in which the pressure in the pressure chamber is guided to a pressure level at which the parking lock device transitions into its disengaged operating condition or is held in its disengaged operating condition when, after a defined time period has lapsed, the pressure regulators are each in the operating condition which allows for the drop of the pressure in the pressure chamber of the parking lock cylinder to the pressure level at which the parking lock is transferrable into its engaged operating condition.

This approach is a target current-based monitoring of the pressure regulators, by which a condition of the control system is recognizable, which results in the release of the hydraulic self-retain of the parking lock device. Via the target current-based monitoring approach, it is detected, within an applicable time, whether the hydraulic self-retain in the area of the parking lock device automatically sets in without further measures or whether a reactivation of the hydraulic self-retain is to be actively carried out via an appropriate actuation of the pressure regulators.

A non-pressurized area is understood to mean, in the present case, a chamber of the hydraulic system or of an automatic transmission, in which ambient pressure prevails. By the description "non-pressurized", it is intended that no force effect occurs in the non-pressurized area as a result of the ambient pressure, since the ambient pressure acts on all surfaces in all spatial directions.

In addition, in the present case, the term "main pressure" or "working pressure" is understood to mean, in the following, a pressure with which a consumer, for example, a hydraulic motor or a hydraulic cylinder, is pressurized. The consumer is the consumer of a hydraulic system, in the area of which the pressure is converted into a force or a torque. In contrast to the main pressure, under a pilot pressure or a control pressure, no consumers are supplied with hydraulic energy. Instead, a hydraulic valve is moved or actuated or switched.

In principle, the hydraulic system may include pressure regulators having either a rising current-pressure characteristic curve or a falling current-pressure characteristic curve. In the case of pressure regulators having a rising current-pressure characteristic curve, the adjusted pressure value increases when the value of the electric current flowing through the pressure regulator is increasing. This means, in the event of a power failure, the adjusted pressure value theoretically drops to zero or to ambient pressure. In contrast thereto, in the case of a pressure regulator having a falling current-pressure characteristic curve, the value of the regulated pressure decreases as the current value increases, and so, in the event of a power failure, the regulated pressure or pilot pressure assumes its maximum value. The latter property is relevant, for example, for emergency controls, in which it must be ensured, in the event of a power failure in the transmission, that certain clutches remain engaged by maintaining the pressurization and, therefore, a transmission ratio step is selected, in which the vehicle remains capable of moving.

The features indicated in the following exemplary embodiments of the subject matter of the invention are suitable for developing the subject matter of the invention by themselves or in any combination with each other.

BRIEF DESCRIPTION OF THE DRAWINGS

Further advantages and advantageous embodiments of the subject matter of the invention result from the claims and the exemplary embodiments, the principle of which is described in the following with reference to the drawings. For the sake of clarity, the same reference characters are used for components having the same design and function in the description of the different embodiments.

In the drawings, the following is shown.

DETAILED DESCRIPTION

Figure 1:
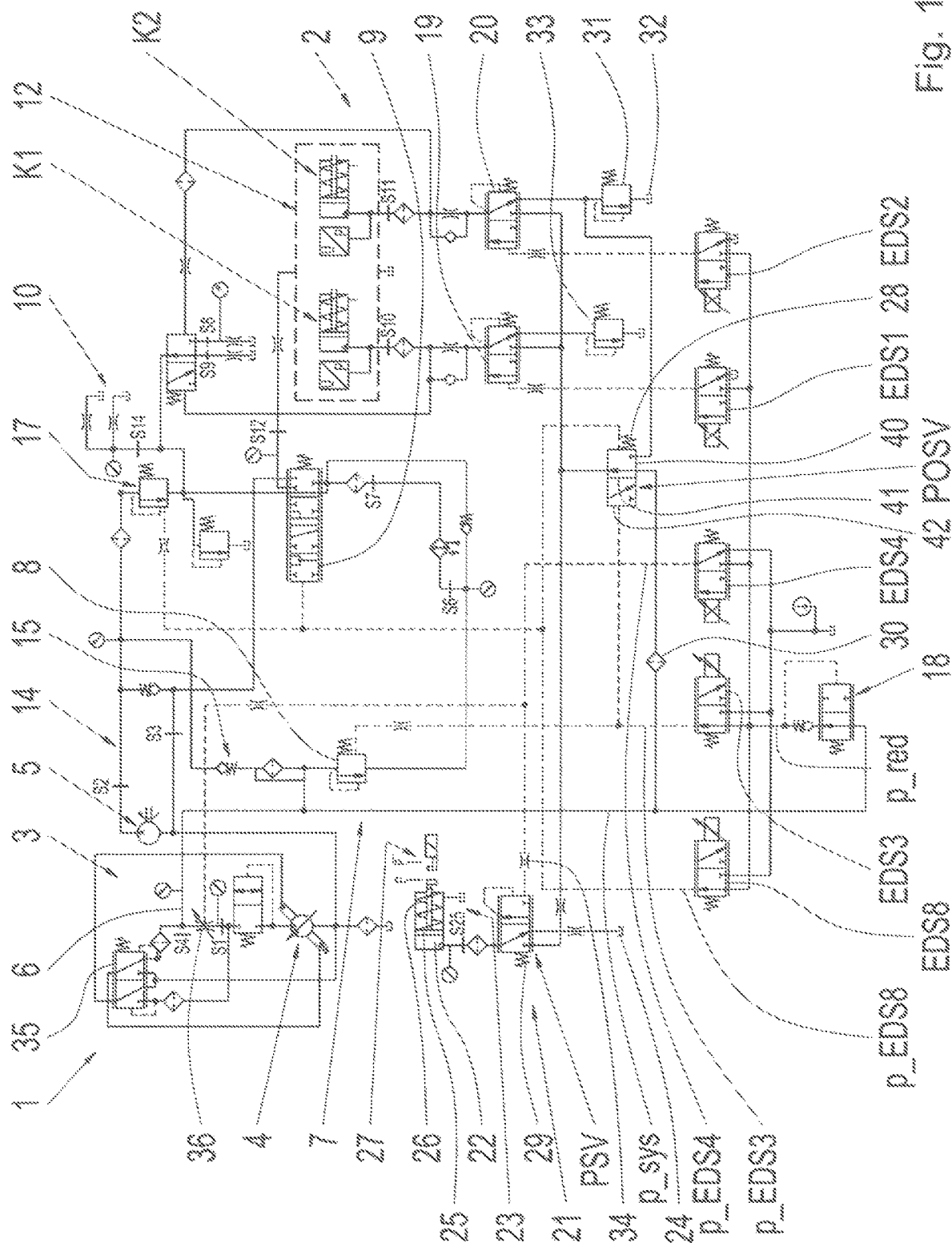
FIG. 1 shows a schematic view of one embodiment of a hydraulic system of an automatic transmission including a parking lock device, with the parking lock device in an engaged operating condition.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows one embodiment of a hydraulic system 1 of an automatic transmission 2 or a dual clutch transmission. The hydraulic system 1 has a pump device 3 including two pump units 4, 5, wherein the first pump unit or pressure medium source 4 is a variable displacement sliding vane pump and the second pump unit 5 or the second pressure medium source is a fixed displacement pump. In this case, the first pump unit 4 is the main gear pump which is coupled, in a way known per se, to a transmission input shaft (not represented in greater detail in the drawing) and, therefore, is drivable by a drive machine, preferably an internal combustion engine, which is connectable to the transmission input shaft of the automatic transmission 2. In contrast thereto, the second pump unit 5 is coupled to the transmission output shaft of the automatic transmission 2 which, in turn, is connectable, in a way known per se, to a driven end of a vehicle drive train including the automatic transmission 2 and which is drivable at an input speed equivalent to the output speed.

A pressure side 6 of the first pump unit 4 is connected to a primary pressure circuit 7, in which a main pressure p_sys or a system pressure prevails, which, in turn, is adjustable via a pilot-controllable system pressure valve 8 or a pilot-controllable valve device. A pilot-controllable valve unit 9, which is a cooling valve, is also provided downstream from the system pressure valve 8. In the switching position of the valve unit 9 represented in FIG. 1, the primary pressure circuit 7 is connected to a further pressure circuit 10 which is a separate low pressure circuit and by which a lubricating spider of the gear set is supplied cooling hydraulic fluid and, moreover, an all-wheel clutch is supplied with cooling hydraulic fluid. In one further switching position of the valve unit 9, the primary pressure circuit 7 is connected to an additional pressure circuit 12, via which the amount of cooling oil required depending on the particular operating condition is applied to the two clutches K1 and K2 of the dual clutch system of the automatic transmission 2.

A pressure side 14 of the second pump unit 5 is connected to the primary pressure circuit 7 via a check valve 15 when there is a positive drop of pressure between the pressure side 14 and the primary pressure circuit 7. A pressure of the pressure side 14 of the second pump unit 5 is variable depending on a further pilot-controllable valve device 17.

In addition, the system pressure p_sys is applied at a pressure reduction valve 18, in the area of which the system pressure p_sys is limited to a defined pressure level of a reduction pressure p_red which is applied at pressure regulators EDS1, EDS2, EDS3, EDS4 and EDS 8. Current is applicable to each of the pressure regulators EDS1 to EDS8, wherein, depending on the particular applied control current and the reduction pressure p_red in the area of the pressure regulators EDS1 to EDS8, a pilot pressure p_EDS1, p_EDS2, p_EDS3, p_EDS4 or p_EDS8 is set, which is applicable, as a pilot pressure, in the area of various valves in the way described in greater detail in the following.

A hydraulic supply of associated actuators takes place, according to demand, via the pump unit 3. In this way, for example, clutch valves 19, 20 associated with the two clutches K1 and K2, and a parking lock device 21 are supplied via the positioning valve POSV originating from the primary pressure circuit 7 or the first pump unit 4 when the positioning valve POSV is in the switching position represented in FIG. 1 or is in the operating condition range shown.

During usual operating conditions, during which a drive machine, which is an internal combustion engine in this case, of a vehicle drive train including the automatic transmission 2 is switched on, a rotational speed of the transmission input shaft is greater than zero and, simultaneously, a vehicle speed or an input speed is also greater than zero, the gear set of the automatic transmission 2 and the all-wheel clutch are supplied with hydraulic fluid via the further pressure circuit 10 at least originating from the second pump unit 5. Since the load on the gear set of the automatic transmission usually increases as the vehicle speed increases, cooling automatically takes place, according to demand, at certain operating points by the second pump unit 5, the pump input speed or flow rate of which is proportional to the vehicle speed.

If the drive machine of the vehicle drive train is switched off at higher ground speeds, for example, during a sailing operation, and the first pump unit 4 delivers no hydraulic fluid, it is possible to supply the primary pressure circuit 7 with hydraulic fluid via the check valve 15 originating from the second pump unit 5 which is then driven at the output speed or at a rotational speed equivalent thereto. If the pressure on the pressure side 14 of the second pump unit 5 is raised via the valve device 17, it is possible to maintain a limited functionality of the automatic transmission 2, for example, a gear select interlock, a clutch cooling, or an application of hydraulic fluid at the parking lock device 21, via the second pump unit 5 at certain operating points of the automatic transmission 2 or of the vehicle drive train.

With respect to the pressure side 6 of the first pump unit 4, a parking lock valve PSV of the parking lock device 21 is provided downstream from the positioning valve POSV, via which a pressure chamber 22 of a parking lock cylinder 23 of the parking lock device 21 is operatively connectable either to the positioning valve POSV or to a non-pressurized area 23, wherein the latter-mentioned operating condition of the parking lock valve PSV is shown in FIG. 1.

In general, a control of the electrohydraulic parking lock device 21, which is part of a so-called park-by-wire system, is carried out via the hydraulic system 1 and its valve switching in the way described in greater detail in the following, in order to ensure an engagement or disengagement of the parking lock device during a single point failure in the area of the positioning valve POSV or in the area of the parking lock valve PSV and, in addition, to prevent either an unintentional engagement of the parking lock device 21 or an unintentional disengagement of the parking lock device 21.

Figure 2:
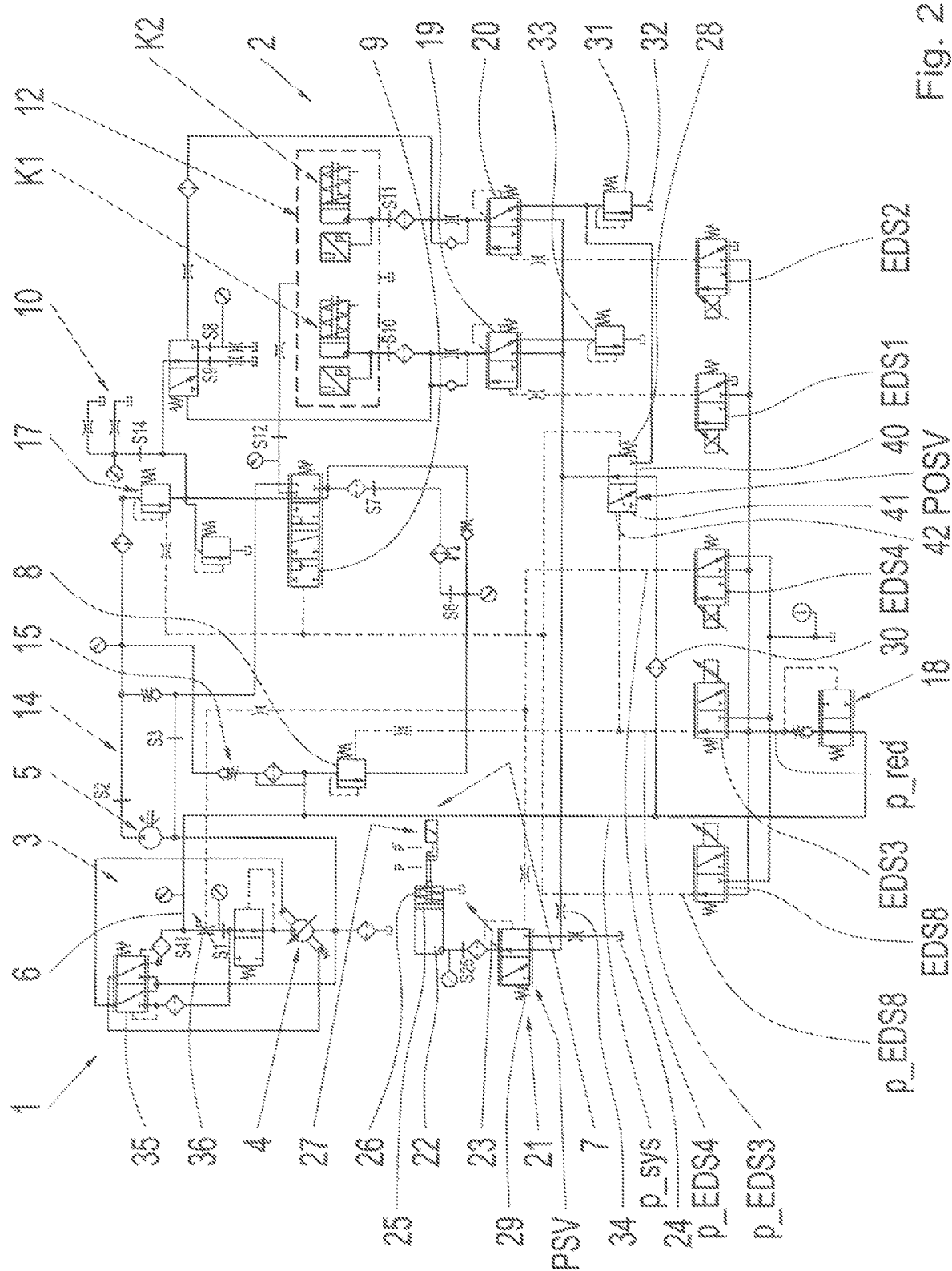
FIG. 2 shows a schematic view of the hydraulic system corresponding to FIG. 1, with the parking lock device in a disengaged operating condition.

When the pressure chamber 22 of the parking lock cylinder 23 is connected to the positioning valve POSV via the parking lock valve PSV, in the operating condition of the positioning valve POSV represented in FIG. 1, the system pressure p_sys is applied, wherein, above a defined pressure threshold of the system pressure p_sys, a parking lock piston 25 of the parking lock device 21 is displaced, against a spring force of a spring device 26, from the position represented in FIG. 1, which corresponds to the engaged operating condition of the parking lock device 21, into a position shown in FIG. 2, which corresponds to the disengaged operating condition of the parking lock device 21. Therefore, the system pressure p_sys in the parking lock cylinder 23 operates as working pressure, since hydraulic energy is converted into mechanical energy in the parking lock cylinder 23.

In the engaged operating condition of the parking lock device 21, there is a form-fit connection between a parking pawl, which is fixed on the housing side, and the output side of the automatic transmission 2, which, in the engaged operating condition of the parking lock device 21, is held by the parking pawl in a rotationally fixed manner to a known extent. When the parking lock cylinder 23 is pressurized, the form-fit connection of the parking lock device 21 is released, which corresponds to the disengaged operating condition of the parking lock device 21. Below an actuating pressure threshold of the pressure in the pressure chamber 22 of the parking lock cylinder 23, the parking lock piston 25 is displaced, by the spring device 26, originating from the disengaged operating condition of the parking lock device 21, from the position shown in FIG. 2 in the direction of the position represented in FIG. 1 when, simultaneously, an electromagnetically actuatable stop device 27, via which the parking lock device 21 is held in the disengaged operating condition, is deactivated.

Both the positioning valve POSV and the parking lock valve PSV are held by a spring device 28 and 29, respectively, in the operating conditions represented in FIG. 1, provided the pilot pressure p_EDS3 applicable at the positioning valve POSV and the pilot pressure p_EDS4 of the pressure regulator EDS4 applicable at the parking lock valve PSV against the actuating force of the spring device 29 are below a defined pressure threshold. In addition, the pilot pressure p_EDS3 is also applicable at the system pressure valve 8, while the pilot pressure p_EDS4 is provided not only for the pilot control of the parking lock valve PSV, but also for controlling the delivery rate of the first pump unit 4.

In this case, the pilot pressure p_EDS8 is applicable, opposing the pilot pressure p_EDS3, at the positioning valve POSV and, additionally, at the pilot-controllable valve device 17 in order to influence a distribution of hydraulic fluid in the direction of the lubricating spider and of the additional pressure circuit 12.

The combination of the connection of the three pressure regulators EDS3, EDS4 and EDS8 yields the functional properties of the hydraulic system 1 described in greater detail in the following.

The parking lock valve PSV and the positioning valve POSV are arranged in a series connection. The positioning valve POSV is supplied with the system pressure p_sys via a filter 30. If the parking lock valve PSV is transferred from the operating condition range represented in FIG. 1 into the operating condition range represented in FIG. 2, then, in addition to the pilot pressure p_EDS4, the pressure between the parking lock valve PSV and the pressure chamber 22 of the parking lock cylinder 23 is also applied at the parking lock valve PSV, in a manner acting equally to the pilot pressure p_EDS4. A self-retain of the parking lock valve PSV opposed to the active actuating force of the spring device 29 is activated in the event of appropriately high pressure values of the pilot pressure p_EDS4 and/or of the pressure between the parking lock valve PSV and the parking lock cylinder 23.

As a result of this version of the parking lock valve PSV, the parking lock valve PSV is initially transferred by the pilot pressure p_EDS4, against the actuating force of the spring device 29, into the operating condition range represented in FIG. 2 and, thereafter, is held by the pilot pressure p_EDS4 and/or by the pressure between the parking lock valve PSV and the parking lock cylinder 23, provided the actuating force resulting from the applied pressures is greater than the actuating force of the spring device 29. In the non-displaced operating condition of the parking lock valve PSV, the particular pressure which has been connected through in the area of the positioning valve POSV is present in the pressure chamber 22 of the parking lock cylinder 23. In this case, the system pressure p_sys is applied at the parking lock valve PSV in the operating condition range of the positioning valve POSV shown in FIG. 1. If the positioning valve POSV is transferred from the operating condition range represented in FIG. 1 into the operating condition range shown in FIG. 3 by the pilot pressure p_EDS3 against the actuating force of the spring device 28, the parking lock valve PSV is connected via the positioning valve POSV to a pre-filling valve 31 which is situated between the positioning valve POSV and a non-pressurized area 32 of the automatic transmission 2. The response limit of the pre-filling valve 31 corresponds to a pressure level in the pressure chamber 22 of the parking lock cylinder 23 at which the parking lock device 21 is transferrable into its engaged condition.

If an operating condition of the automatic transmission 2 is demanded by the driver via a selector lever or via a control element equivalent thereto, in which a ratio for forward travel D or reverse operation R is to be selected in the automatic transmission 2, or a neutral operating condition N of the automatic transmission 2, during which a power flow is interrupted in the area of the automatic transmission 2, is to be established, the parking lock device 21 is disengaged during a mode of operation of the hydraulic system 1 as specified. The above-described operating conditions of the automatic transmission 2 correspond to selector lever positions or driving positions D, R or N. In each of the driving positions D, R or N, the clutch valves 19 and 20 as well as the parking lock valve PSV are connected via the positioning valve POSV to the system pressure line of the hydraulic system 1 and are pressurized with the system pressure p_sys via the positioning valve POSV.

Figure 3:
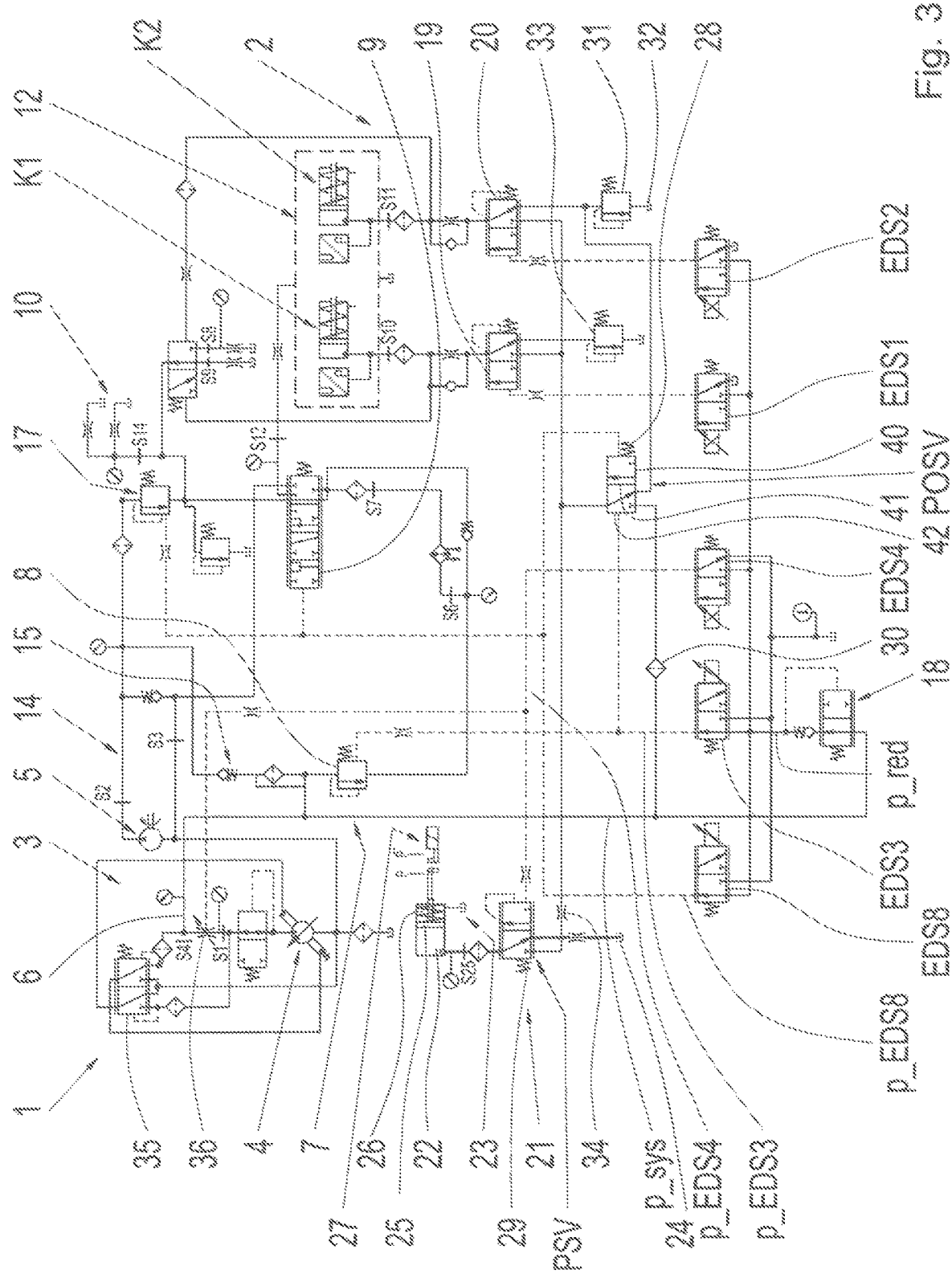
FIG. 3 shows a schematic view of the hydraulic system corresponding to FIG. 1, particularly during an engagement process of the parking lock device.

If there is an appropriate demand, by the driver, to engage the parking lock device 21, the positioning valve POSV is transferred from the operating condition represented in FIG. 1 into the operating condition range shown in FIG. 3. For this purpose, the pilot pressure p_EDS8 is lowered to zero via the pressure regulator EDS8. Since the pressure regulator EDS8 is an inverse pressure regulator in this case, it is energized to the maximum extent for this purpose. Simultaneously, the pilot pressure p_EDS3 is raised to a pressure level at which the positioning valve POSV is transferred into the operating condition range represented in FIG. 3 against the actuating force of the spring device 28. The change-over of the positioning valve POSV causes the pressure applied at the parking lock valve PSV to abruptly decrease and the self-retain function of the parking lock valve PSV is deactivated when the pilot pressure p_EDS4 is appropriately set, whereby the parking lock valve PSV is transferrable by the actuating force of the spring device 29 into the operating condition range represented in FIG. 1, in which the pressure chamber 22 of the parking lock cylinder 23 is connected to the non-pressurized area 23 via the parking lock valve PSV. In turn, this causes the pressure in the pressure chamber 22 to decrease and, provided the stop device 27 is deactivated, the parking lock piston 25 of the parking lock cylinder 23 is transferred into its position of the spring device 26, which is shown in FIG. 1 and corresponds to the engaged operating condition of the parking lock device 21, whereby the parking lock device 21 is engaged. In this case, a movement of the parking lock piston 25 is monitored via a parking lock sensor which is not represented in greater detail.

The vent path of the pressure chamber 22 via the parking lock valve PSV in the direction of the non-pressurized area 24 is marked in greater detail in FIG. 3 via the relatively bold line. By way of the displacement of the positioning valve POSV, the line range of the hydraulic system 1 between the positioning valve POSV and the parking lock valve PSV and extending to the clutch valves 19 and 20 and emphasized in FIG. 4 with the aid of bold lines is switched to a non-pressurized condition or is guided to the pressure level or the response limit of the pre-filling valve 31. Via the pre-filling valve 31, under operating conditions, the clutch K2 is merely prevented from draining. For this purpose, a further pre-filling valve 33 is also assigned to the clutch K1.

In order to ensure that the parking lock device 21 is transferrable into the engaged operating condition as demanded when there is a single point failure in the area of the parking lock valve PSV or in the area of the positioning valve POSV and when there is a demand to engage the parking lock device 21 originating from a disengaged operating condition, the hydraulic system 1 has the redundancy described in greater detail in the following and is actuatable as follows.

Figure 4:
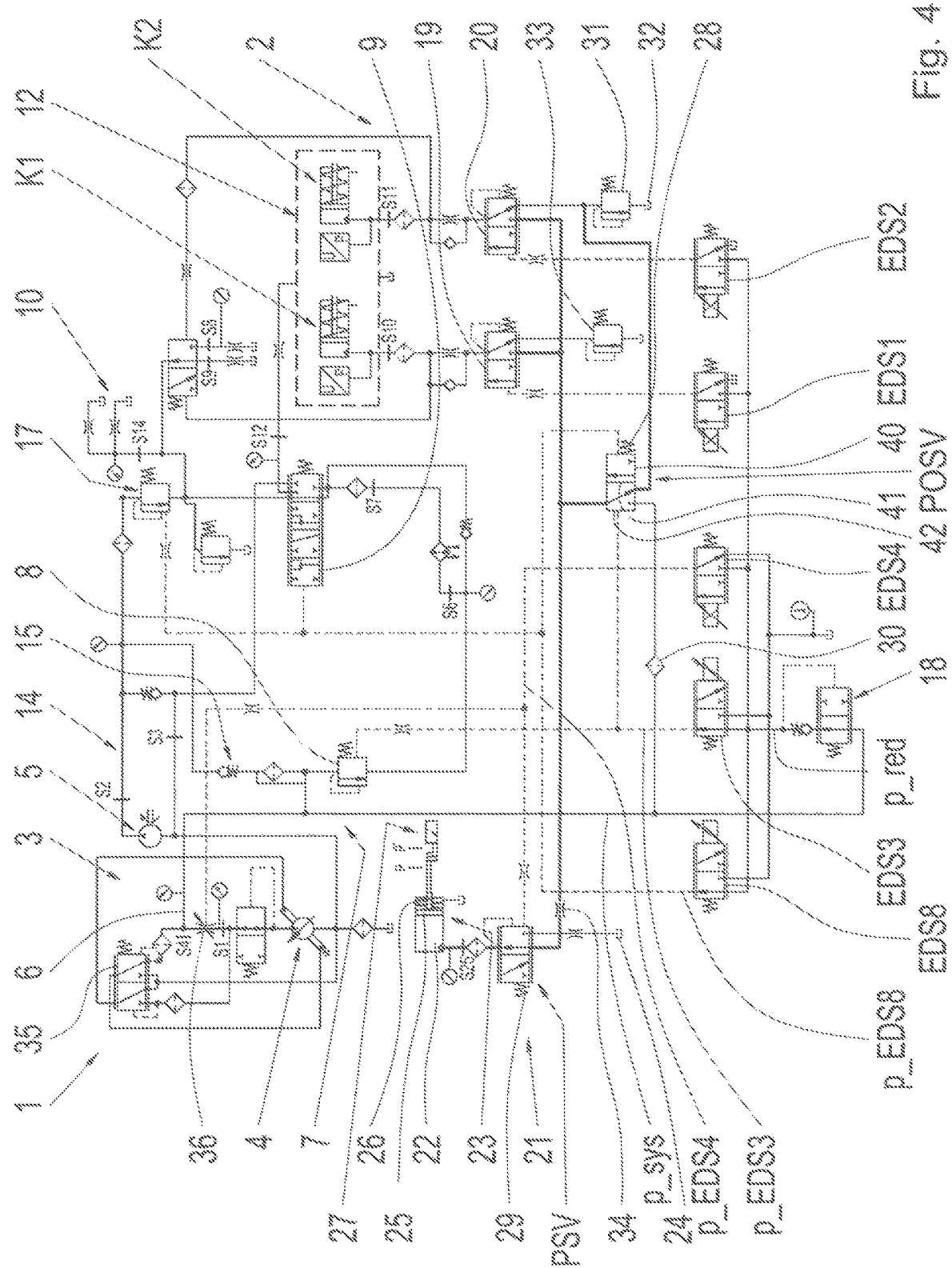
FIG. 4 shows a schematic view of the hydraulic system according to FIG. 1 when there is a demand to engage the parking lock device.
Figure 5:
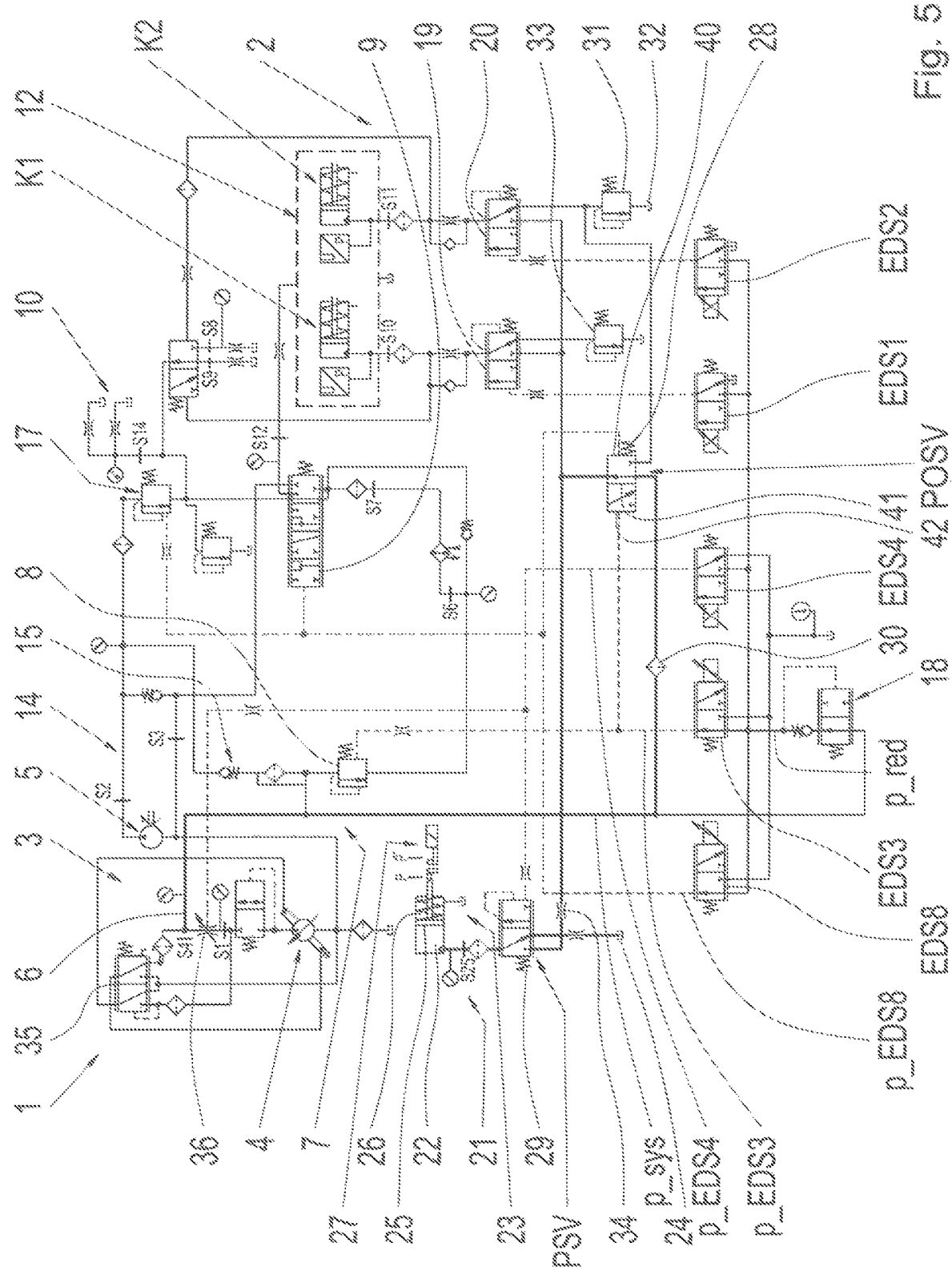
FIG. 5 shows a schematic view of the hydraulic system according to FIG. 1 including a jammed positioning valve and simultaneous venting of the parking lock device via a parking lock valve.
Figure 6:
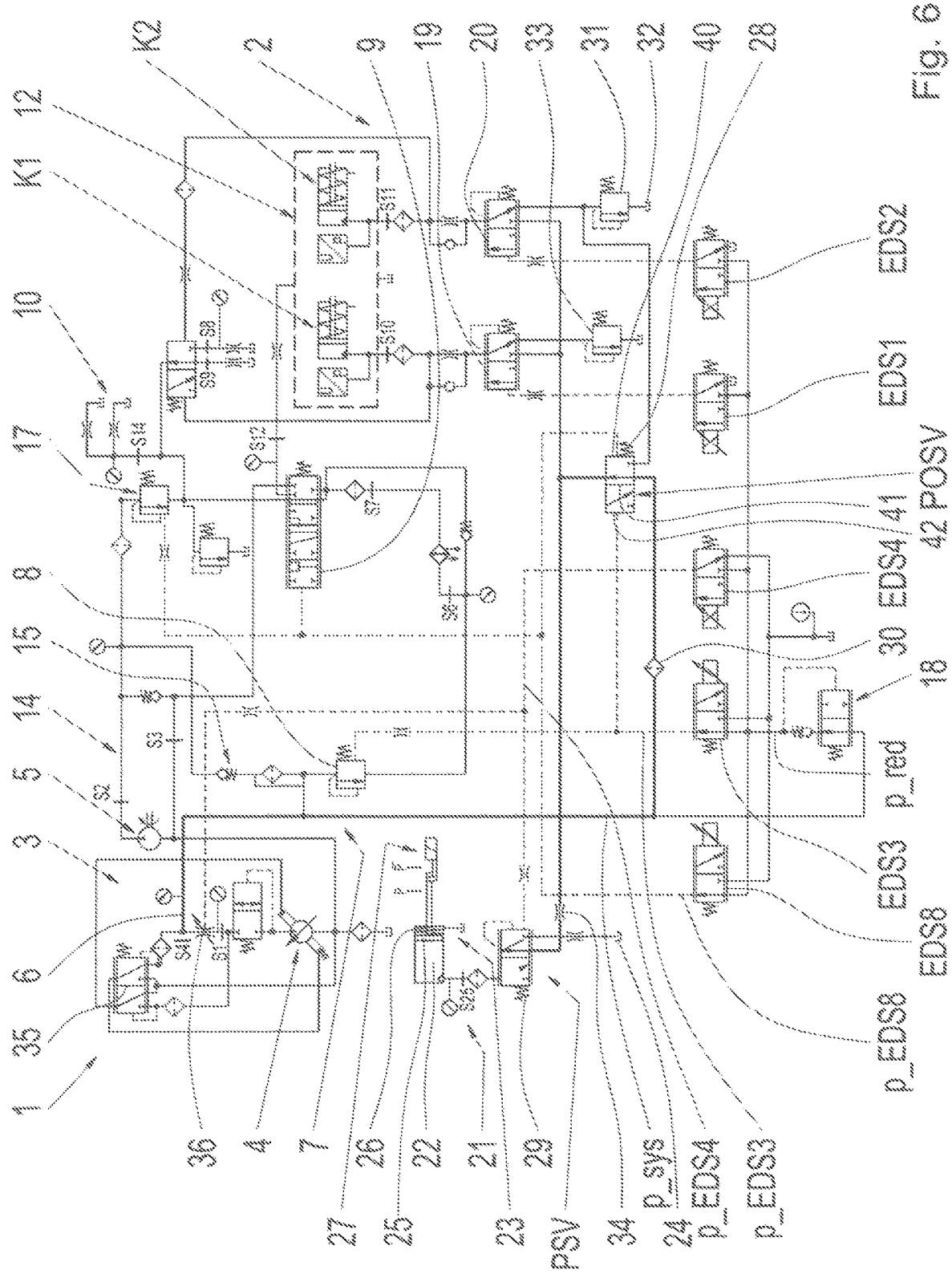
FIG. 6 shows a schematic view of the hydraulic system according to FIG. 1 including a jammed positioning valve and a simultaneous demand to disengage the parking lock device.

If the positioning valve POSV cannot be transferred from the operating condition range represented in FIG. 5 and in FIG. 6 into the operating condition range shown in FIG. 4, against the actuating force of the spring device 28, due to a jammed operating condition or a failure of the pressure regulator EDS3, the self-retain of the parking lock valve PSV is deactivated by reducing the pilot pressure p_EDS4 in the area of the pressure regulator EDS4 and simultaneously lowering the system pressure p_sys. Thus, the parking lock valve PSV is transferred, by the actuating force of the spring device 29, from the operating condition range represented in FIG. 6 into the operating condition range represented in FIG. 5 by the system pressure p_sys—which is applied to the extent marked in greater detail with the aid of the bold lines—being disconnected from the pressure chamber 22 via the positioning valve POSV in the area of the parking lock valve PSV, while the pressure chamber 22 is operatively connected to the non-pressurized area 24 via the parking lock valve PSV and is vented via the parking lock valve PSV. In this operating condition of the hydraulic system 1, the parking lock device 21 is switched to a non-pressurized condition, whereby the parking lock device 21 transitions into its engaged operating condition while the stop device 27 is simultaneously deactivated.

Since the pressure connection between the primary pressure circuit 7 delivering system pressure p_sys and the parking lock cylinder 23 takes place via the two valves which are actuatable independently of one another, i.e., the positioning valve POSV and the parking lock valve PSV, the parking lock device 21 is engageable to the demanded extent even when there is a single point failure in the area of the parking lock valve PSV. If the parking lock valve PSV jams in the operating condition range represented in FIG. 6, the positioning valve PSV, when functioning as specified, is transferred into its operating condition range represented in FIG. 4 by way of an appropriate actuation via the pilot pressure p_EDS3, the parking lock valve PSV is connected to the pre-filling valve 31 and the parking lock cylinder 31 is vented via the pre-filling valve 31. A throttling device 34 provided between the positioning valve POSV and the parking lock valve PSV is utilized, during the disengagement of the parking lock device 21, for limiting the oil flow introduced into the pressure chamber 22 in this case, in order to avoid system pressure drops.

Moreover, the version of the hydraulic system 1 also offers the possibility to also hold the parking lock device 21 in the disengaged operating condition during defined operating condition progressions of the automatic transmission 2 or of the hydraulic system 1 when there is a demand to disengage the parking lock device 21 when there is a single point failure in the area of the parking lock valve PSV or in the area of the positioning valve POSV.

If, for example, the operating conditions D, R, N are demanded, during which the parking lock device 21 is disengaged during faultless operation, and if there is also no demand to engage the parking lock device 21, the above-described condition of the gear shift system for the redundant engagement of the parking lock device 21 is also usable in a targeted manner to the extent described in greater detail in the following to hold the parking lock device 21 redundantly disengaged at certain operating points.

The positioning valve POSV and the parking lock valve PSV each include two pressure connections, via which the pilot pressures p_EDS3 and p_EDS8 are applicable at the positioning valve POSV, while the pilot pressure p_EDS4 as well as the pressure between the parking lock valve PSV and the parking lock cylinder 23 are applicable at the parking lock valve PSV.

As explained above, the self-retain function of the parking lock valve PSV is deactivated when the actuating force of the spring device 29 is greater than the actuating forces resulting from the pressures applied at the parking lock valve. This results in a pressure release at the parking lock valve PSV and the parking lock valve PSV transitions into the operating condition range represented, for example, in FIG. 5.

In the above-described exemplary embodiment of the hydraulic system 1, the holding pressure level of the parking lock valve is above 5 bar, preferably is approximately 5.5 bar. The minimum pressure level of the system pressure p_sys during the operation of the automatic transmission 2 is approximately 3.5 bar. If the automatic transmission 2 is operated in a so-called ECO mode, an attempt is made to minimize an energy consumption of the automatic transmission 2. For this purpose, the system pressure p_sys is lowered to the minimum pressure level and the displacement volume of the first pump unit 4 is also reduced. For this purpose, a displacement volume control valve 35 of the hydraulic system 1 is blocked by applying the pilot pressure p_EDS4 of the pressure regulator EDS4 at an adjustable orifice valve 36 and a lifting ring of the variable displacement pump or the first pump unit 4 is pressed away from the maximum stop. In this ECO mode, which is characterized by the minimum system pressure p_sys and a preferably low flow rate in the area of the first pump unit 4, the parking lock valve PSV nevertheless remains in its displaced position, i.e., in its set position, since an appropriately high pilot pressure p_EDS4 is applied at the parking lock valve PSV during the activated ECO mode and the parking lock valve PSV is transferred into the operating condition range represented in FIG. 6, against the actuating force of the spring device 29, by the pilot pressure p_EDS4 despite the lowered system pressure p_sys. In this operating condition of the hydraulic system 1, the energization, for example, of a holding magnet of the lock device 27 is switched off, since the parking lock device 21 is hydraulically held in the disengaged operating condition and a single redundancy is ensured. During a further operating condition progression of the automatic transmission 2 or of a vehicle drive train designed therewith, during which a sailing operation is activated while the drive machine is simultaneously switched off, the first pump unit 4 delivers no flow.

Since the rotational speed of the driven end is greater than zero and is usually also greater than a threshold value during a sailing operation of a vehicle while the drive machine is simultaneously switched off, the hydraulic supply of the hydraulic system 1 during such a sailing operation takes place via the second pump unit 5, wherein the system pressure is then adjusted in the area of the valve device 17 and is applied at the positioning valve POSV via the check valve 15. For this purpose, the pressure regulator EDS8 is switched off in order to set the maximum pressure in the area of the valve device 17. In this operating condition of the hydraulic system, the valve device 17 operates as a substitute system pressure valve which delivers a substitute system pressure level p_sys which is greater than the holding pressure of the parking lock valve, in order to enable the self-retain function of the parking lock valve PSV to be activated.

It is therefore ensured, during a sailing operation, even with the drive machine switched off, that the parking lock device 21 is hydraulically held in the disengaged operating condition and is additionally secured, via the stop device 27, against an unintentional engagement, wherein an energization of the electromagnet of the stop device 27 is also switched off in this case, at least temporarily.

The pressure regulator EDS4 is ineffective during the latter-described operating condition progression, since the first pump unit 4 is not driven by the drive machine. Shortly before the vehicle comes to a standstill, for example, at vehicle speeds between 5 km/h and 10 km/h, the flow rate of the second pump unit 5 also decreases to a level at which the parking lock valve PSV is to be additionally pressurized with the pilot pressure p_EDS4, originating from the pressure regulator EDS4, in order to maintain the self-retain function, since the system pressure p_sys then drops below the self-retain threshold of the parking lock valve PSV due to the very low flow rate of the second pump unit 5.

Figure 7:
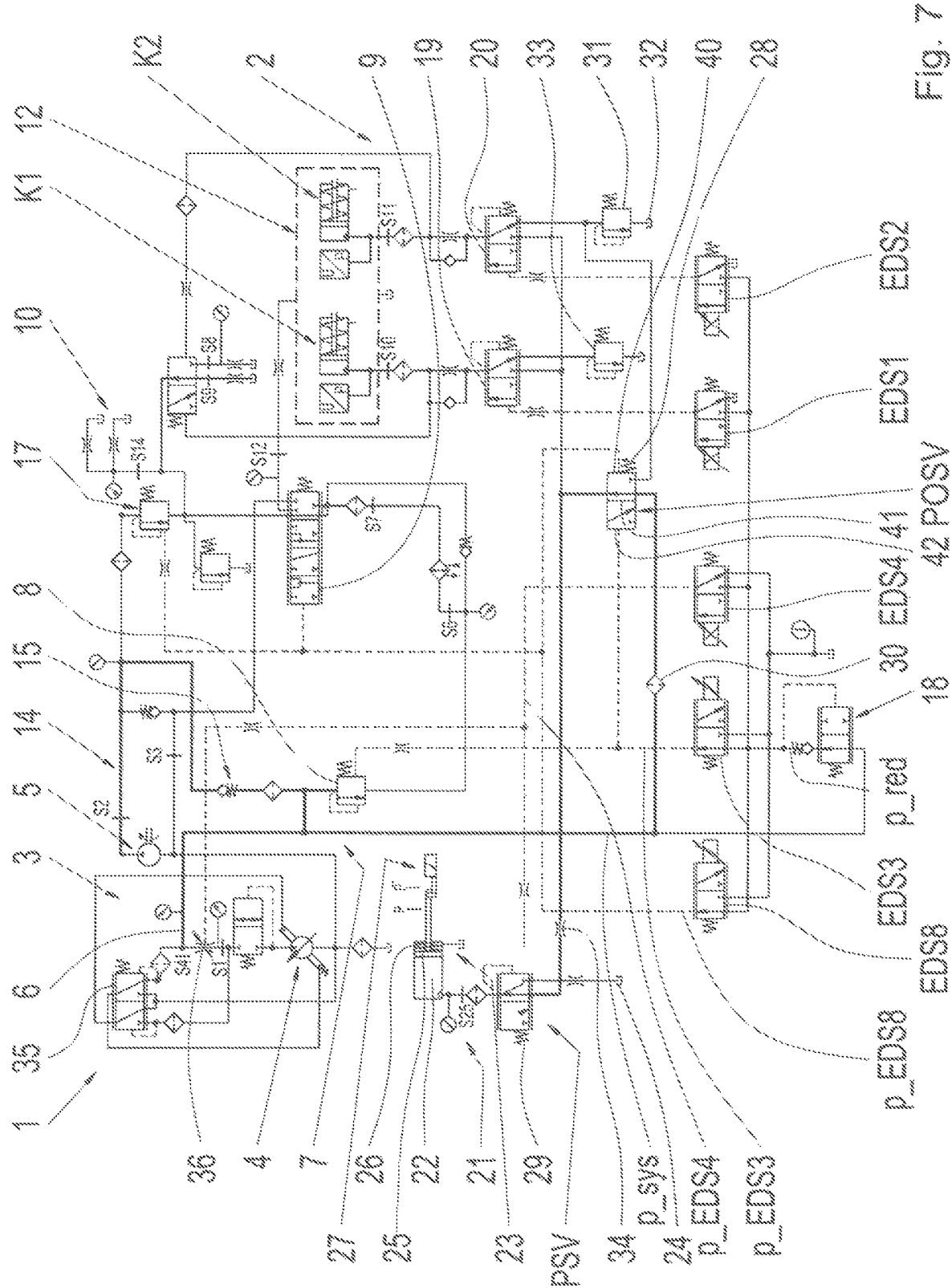
FIG. 7 shows a schematic view of the hydraulic system according to FIG. 1 during a sailing operation while the drive machine is simultaneously switched off and a vehicle speed is greater than a threshold.

The supply path of the parking lock device 21 originating from the second pump unit 5 via the check valve 15 and the positioning valve POSV and the parking lock valve PSV is marked in greater detail in FIG. 7, with the aid of the bold lines.

In order to prevent an unintentional disengagement of the parking lock device 21, for example, after a restart of the drive machine, even when there is a hydraulic single point failure in the area of the parking lock valve PSV or in the area of the positioning valve POSV, the hydraulic system 1 is operated in the way described in greater detail in the following.

Figure 8:
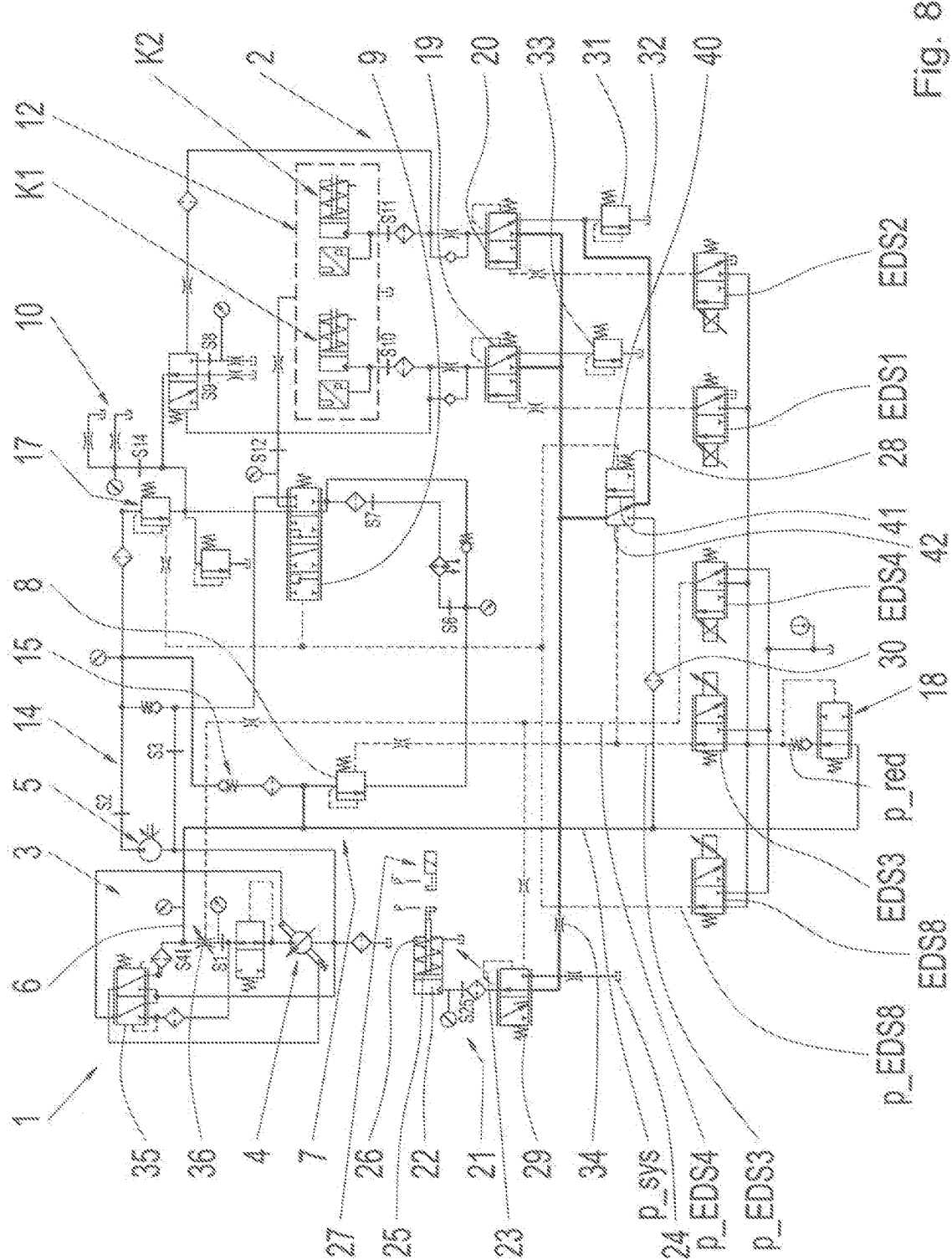
FIG. 8 a schematic view of shows the hydraulic system according to FIG. 1 with the parking lock device disengaged and the positioning valve set in order to prevent an unintentional disengagement.

If the driver demands, for example, via a selector lever position P, an engaged operating condition of the parking lock device 21 after a restart of the drive machine and the parking lock valve PSV is jammed in the non-displaced position or the parking lock valve PSV cannot be transferred by the actuating force of the spring device 29 out of the operating condition range represented in FIG. 8 into the operating condition range represented in FIG. 1, the positioning valve POSV is transferred into the operating condition range represented in FIG. 8 by the application of an appropriate pilot pressure p_EDS3 via the pressure regulator EDS3, and the connecting line between the primary pressure circuit 7 and the parking lock device 21 is disconnected in the area of the positioning valve POSV. An unintentional disengagement of the parking lock device 21 is avoided despite a faulty parking lock valve PSV, since the pressure in the pressure chamber 22 of the parking lock cylinder 23 drops by the above-described extent via the positioning valve POSV and the pre-filling valve 31.

If the positioning valve POSV jams, however, in the position represented in FIG. 7 or if the positioning valve POSV cannot be displaced by the pilot pressure p_EDS3 against the actuating force of the spring device 28 by the desired extent, the parking lock device 21 is also not pressurized with the system pressure p_sys, whereby an unintentional disengagement of the parking lock device 21 is avoided. In such an operating condition of the positioning valve POSV, the lines extending in the direction of the two clutches K1 and K2 are also disconnected from the system pressure p_sys, and so a single point failure in the area of one of the clutch valves 19 or 20 also cannot affect an unintentional force-fit connection.

In the event of a failure of the pressure regulator EDS_3, which is an inverse pressure regulator in this case, the positioning valve POSV is pressurized with the maximum pilot pressure p_EDS3 and, with the aid thereof, is actuated against the actuating force of the spring device 28. In order to enable a vehicle availability to be maintained even in the event of a failure of the pressure regulator EDS3, the positioning valve POSV has a ratio between a control surface 40 of a valve slide 41 of the positioning valve POSV, at which the pilot pressure p_EDS8 is applicable, and a further control surface 42 of the valve slide 41, at which the pilot pressure p_EDS3 of the pilot control is applicable, such that the positioning valve POSV is transferred into its defined operating condition, against the pilot pressure p_EDS3 of the pilot control applied at the valve slide 41, with the aid of the pilot pressure p_EDS8, which is applicable at the valve slide 41, and the actuating force of the spring device 28 acting on the valve slide 41 in the same direction, and the parking lock device 21 is hydraulically held in the disengaged operating condition. As soon as the pilot pressure p_EDS8 is reduced in the direction of its minimum pressure value in the area of the pressure regulator EDS8, the positioning valve POSV is transferred by the pilot pressure p_EDS3 into the operating condition range represented in FIG. 8 and the parking lock device 21 is engageable by deactivating the self-retain function of the parking lock valve PSV or via the positioning valve POSV and the pre-filling valve 31 to the above-described extent while the stop device 27 is simultaneously deactivated.

During an engagement process of the parking lock device 21 and an associated draining of the parking lock cylinder 23, the flow directed out of the pressure chamber 22 via the parking lock valve PSV is guided either via the tank recess of the parking lock valve PSV in the direction of the non-pressurized area 24 or via the positioning valve POSV and the pre-filling valve 31 in the direction of the non-pressurized area 32. During the draining of the parking lock cylinder 23 via the parking lock valve PSV, the positioning valve POSV, and the pre-filling valve 31, the flow is to be guided through the throttling device 34, the minimum through-flow cross-section of the throttling device 34 being smaller than a minimum through-flow cross-section of the line range extending between the parking lock valve PSV and the non-pressurized area 24. For this reason, the draining time of the parking lock cylinder 23 via the positioning valve POSV and the pre-filling valve 31 is longer than the draining time via the parking lock valve PSV in the direction of the non-pressurized area 24. If the engagement time of the parking lock device 21 is ascertained by software during an engagement process of the parking lock device 21 originating from the activation of the pressure regulator EDS3 up to the feedback of the parking lock sensor or the parking lock path sensor system, it is detectable, already before the drive machine is switched off, whether the parking lock valve PSV is stuck in a jammed position and, therefore, a suitable activation sequence for the positioning valve is carried out in the case of a restart of the drive machine.

Figure 9:
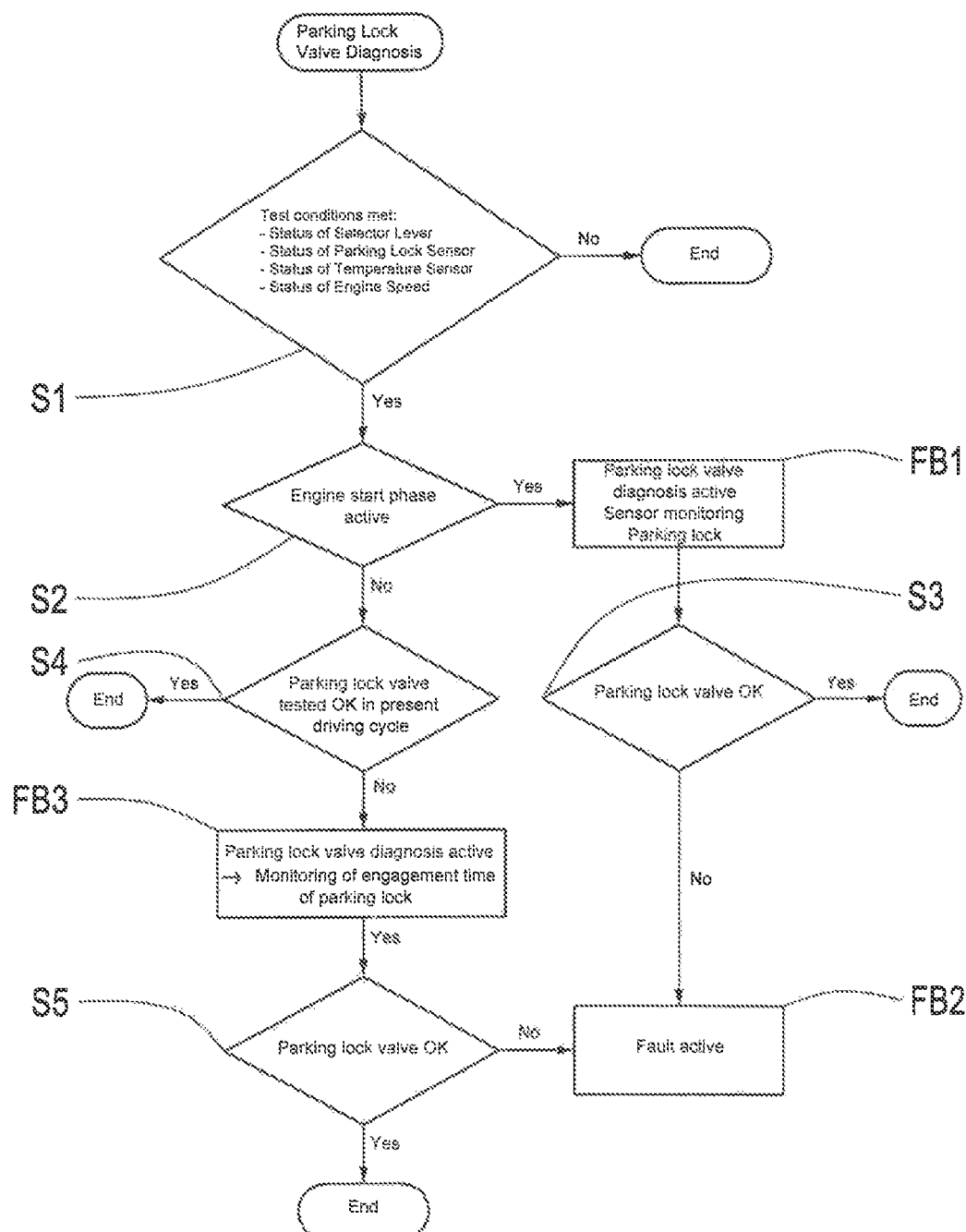
FIG. 9 shows a flow chart of a diagnosis of the mode of operation of the parking lock valve.

FIG. 9 shows a flow chart of a diagnosis of the parking lock valve PSV, via which it is ascertained whether the parking lock valve PSV is operating to the desired extent.

During a first query step S1, it is determined whether valid values with respect to a selector lever, the parking lock sensor, a temperature sensor, an engine speed sensor, and the like, are present. If the query result is negative, the diagnosis is terminated. If the query result is positive, the process branches off to a second query step S2. During the second query step S2, it is determined, in turn, whether an engine start phase is presently active. If the query result of the second query step S2 is positive, the process branches off to a first function block FB1, via which the diagnosis of the parking lock valve PSV is activated and the monitoring of the parking lock device 21 is carried out via the parking lock sensor.

From the first function block FB1, the process branches off to a third query step S3, during which the mode of operation of the parking lock valve is monitored. If a mode of operation of the parking lock valve PSV as specified is ascertained during the third query step S3, the diagnostic function of the parking lock valve PSV is terminated, whereas, if a malfunction of the parking lock valve PSV is ascertained, the process branches off from the third query step S3 to a second function block FB2, via which the faulty function of the parking lock valve PSV is stored in the transmission controller in order to enable the malfunction to be taken into account during the further operation of the automatic transmission 2 and of the parking lock device 21.

If it is ascertained during the second query step S2 that an engine start phase is not presently activated, the process branches off to a fourth query step S4 and it is determined whether a mode of operation of the parking lock valve PSV as specified has already been ascertained in the present driving cycle. In this case, a driving cycle is understood to mean an operating condition progression of a vehicle drive train including the automatic transmission 2, during which an engine speed of the drive machine as well as a vehicle speed or an output speed have each exceeded a defined threshold value.

If the query result of the third query step S3 is positive, the diagnostic function of the parking lock valve PSV is terminated. If the query result of the third query step S3 is negative, the process branches off to a third function block FB3, via which the diagnosis of the parking lock valve PSV is further activated and the engagement time of the parking lock device 21 is monitored. Thereafter, it is determined, during a fifth query step S5 as it was determined during the third query step S3, whether the parking lock valve PSV is faulty or not. If the query result is positive, the diagnostic function of the parking lock valve PSV is terminated. If the query result of the fifth query step S5 is negative, however, the process branches off to the second function block FB2 and a fault entry takes place.

Figure 10:
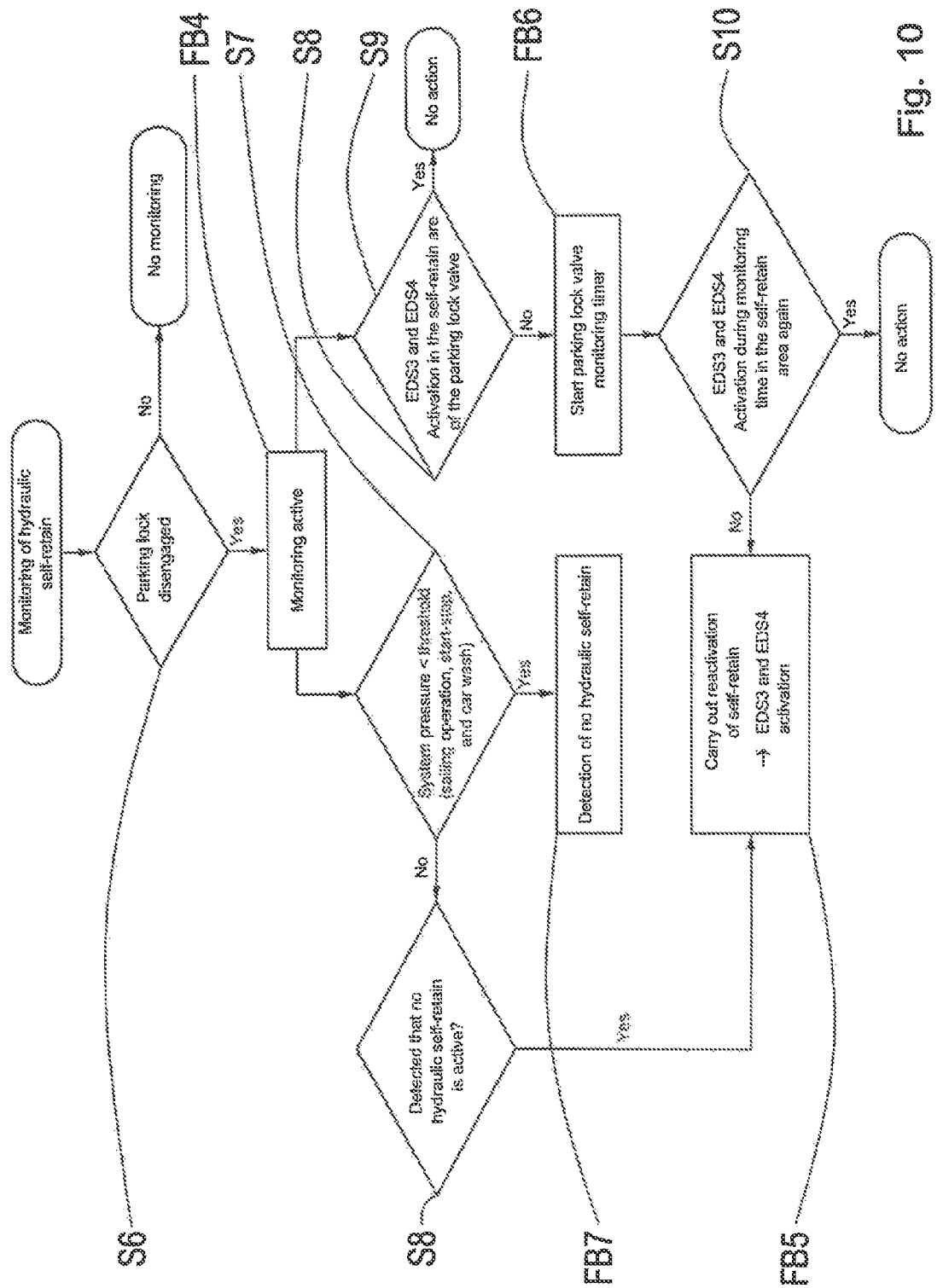
FIG. 10 shows a flow chart of a monitoring of the hydraulic self-retain of the parking lock device.

In FIG. 10, a further flow chart of a monitoring function of the hydraulic self-retain of the parking lock device 21 is represented, wherein, during a sixth query step S6, it is initially determined whether the parking lock device 21 is in the disengaged operating condition. If the query result of the sixth query step S6 is negative, the monitoring function is terminated. In contrast thereto, if the query result of the sixth query step S6 is positive, the process branches off to a fourth function block FB4 and the monitoring is activated. The process branches off from the fourth function block FB4 to a seventh query step S7. During the seventh monitoring step S7, it is determined, in turn, whether the system pressure p_sys is lower than a threshold value. This is the case, for example, during a sailing operation while the drive machine is simultaneously switched off, during an activated start-stop operation when the vehicle is at a standstill or is nearly at a standstill, and during a so-called car wash operation, during which the parking lock is disengaged and the drive machine is simultaneously switched off. If the query result is negative, the process branches off to an eighth query step S8, during which it is detected that the hydraulic self-retain of the parking lock device 21 is not activated. From the eighth query step S8, the process branches off to a fifth function block FB5, via which the hydraulic self-retain is reactivated by way of an appropriate activation of the pressure regulators EDS3 and EDS4.

In addition, the process branches off from the fourth function block FB4 to a ninth query step S9, via which it is determined whether the self-retain function of the parking lock valve ps4 has been activated by an appropriate actuation of the pressure regulators EDS3 and EDS4. If the query result of the ninth query step S9 is positive, no further action takes place. If the query result of the ninth query step S9 is negative, however, the process branches off to a sixth function block FB6, via which a time monitoring is started. Thereafter, the process branches off from the sixth function block FB6 to a tenth query step S10. With the aid of the tenth query step S10, it is determined whether the pressure regulators EDS3 and EDS4 are actuated within a defined monitoring time period to such an extent that the hydraulic self-retain of the parking lock device 21 is activated again. If the query result of the tenth query step S10 is positive, no further action takes place. In contrast thereto, if the query result of the tenth query step S10 is negative, the process branches off to the fifth function block FB5 and the self-retain function is reactivated. In addition, if the query result of the seventh query step S7 is positive, the process branches off to a seventh function block FB7, with the aid of which it is detected that there is no hydraulic self-retain in the area of the parking lock device.

In one further embodiment of the hydraulic system, the pressure regulator EDS8 is a rising pressure regulator and the positioning valve PSV and the valve device 17 are adapted to the extent required to enable the above-described functionalities of the hydraulic system to be implemented.

Modifications and variations can be made to the embodiments illustrated or described herein without departing from the scope and spirit of the invention as set forth in the appended claims.

REFERENCE CHARACTERS 1 hydraulic system
2 automatic transmission
3 pump device
4 first pump unit
5 second pump unit
6 pressure side of the first pump unit
7 primary pressure circuit
8 system pressure valve
9 valve unit
10 further pressure circuit
12 additional pressure circuit
14 pressure side of the second pump unit
15 check valve
17 valve device
18 pressure reduction valve
19 clutch valve
20 clutch valve
21 parking lock system
22 pressure chamber
23 parking lock cylinder
24 non-pressurized area
25 parking lock piston
26 spring device
27 stop device
28 spring device
29 spring device
30 filter
31 pre-filling valve
32 non-pressurized area
33 further pre-filling valve
34 throttling device
35 displacement volume control valve
36 orifice valve
40 control surface
41 valve slide
42 control surface
EDS1-EDS8 pressure regulator
K1, K2 clutch
p_sys system pressure
POSV positioning valve
PSV parking lock valve
S1-S10 query step
FB1-FB7 function block
p_EDS1-p_EDS8 pilot pressure
p_red reduction pressure

The invention claimed is:

1. A method for operating a parking lock device (21) with a hydraulic system (1) that includes a parking lock valve (PSV) which is pilot-controllable against an actuating force and at which a main pressure (p_sys) is applicable in a defined operating condition range of a positioning valve (POSV), the positioning valve (POSV) pilot-controllable against an actuating force via a pilot control, a pressure chamber (22) of a parking lock cylinder (23) pressurized with the main pressure (p_sys) via the parking lock valve (PSV) in a defined operating condition range of the parking lock valve (PSV) to disengage the parking lock device (21) or to hydraulically hold the parking lock device (21) in the disengaged condition, the pressure chamber (22) connected to a non-pressurized area (24) via the parking lock valve (PSV) in a further operating condition range of the parking lock valve (PSV) to engage the parking lock device (21), the method comprising:

during a demand to engage the parking lock device (21) from a disengaged operating condition of the parking lock device (21), applying a pilot pressure (p_EDS4) at the parking lock valve (PSV) or applying both the pilot pressure (p_EDS4) and the main pressure (p_sys) at the parking lock valve (PSV) via the positioning valve (POSV); and guiding each of the pilot pressure (p_EDS4) and the main pressure (p_sys) to defined pressure levels at which the parking lock valve (PSV) is transferrable into the further operating condition range of the parking lock valve (PSV) by the actuating force of the parking lock valve (PSV) against the pilot pressure (p_EDS4) and against a pressure between the parking lock valve (PSV) and the parking lock cylinder (23).

2. The method of claim 1, further comprising, during the demand to engage the parking lock device (21) from the disengaged operating condition of the parking lock device (21), applying a pilot pressure (p_EDS3) of the pilot control at the positioning valve (POSV) to oppose the actuating force of the positioning valve (POSV).

3. The method of claim 2, further comprising:

applying the pressure between the parking lock valve (PSV) and the pressure chamber (22) at the parking lock valve (PSV) as control pressure opposing the actuating force of the parking lock valve (PSV);

during a demand to disengage the parking lock device (21), applying the pilot pressure (p_EDS4) at the parking lock valve (PSV) against the actuating force of the parking lock valve (PSV) when the pressure between the parking lock valve (PSV) and the pressure chamber (22) of the parking lock cylinder (23) is detected to be less than a threshold value at which the parking lock valve (PSV) is transferred by the actuating force of the parking lock valve (PSV) into the further operating condition range of the parking lock valve (PSV); and during the demand to disengage the parking lock device (21), adjusting the pilot pressure (p_EDS3) applied at the positioning valve (POSV) to a pressure level at which the positioning valve (POSV) is transferred into or held in the defined operating condition range of the positioning valve (POSV) via the actuating force of the positioning valve (POSV).

4. The method of claim 1, further comprising pressurizing the parking lock device (21) with hydraulic pressure in the direction of the disengaged operating condition of the parking lock device (21) by adjusting a main pressure (p_sys) with the pilot-controllable valve device (17) associated with a second pressure medium source (5) during:

a demand to disengage the parking lock device (21);

an operating condition of a first pressure medium source (4) in which a displacement volume of a first pressure medium source (4) and the main pressure (p_sys) made available by the first pressure medium source (4) are at least approximately zero; and an operating condition of the second pressure medium source (5) in which a flow rate of the second pressure medium source (5) and a main pressure (p_sys) made available by the second pressure medium source are greater than zero, wherein the parking lock valve (PSV) is actuated by the main pressure (p_sys), the pilot pressure (p_EDS4) or both in the direction of the defined operating condition range of the parking lock valve (PSV).

5. The method of claim 1, wherein the main pressure (p_sys) and the pilot pressure (p_EDS4) applied at the parking lock valve (PSV) are guided to the defined pressure levels upon detection of a malfunction of the positioning valve (POSV).

6. The method of claim 1, wherein the main pressure (p_sys) and the pilot pressure (p_EDS4) applied at the parking lock valve (PSV) are guided to the defined pressure levels during an active actuation of a drive clutch (K1, K2) of an automatic transmission (2), the drive clutch (K1, K2) pressurizable with the main pressure (p_sys) via the positioning valve (POSV).

7. The method of claim 1, further comprising, during the demand to engage the parking lock device (21), applying the pilot pressure (p_EDS3) acting in the direction of a further operating condition range of the positioning valve (POSV) and against the actuating force at the positioning valve (POSV) to hold the parking lock device (21) in or transfer the parking lock device (21) into an engaged operating condition of the parking lock device (21) and without actuating the parking lock valve (PSV) by the pilot pressure (p_EDS4) or by the pressure between the parking lock valve (PSV) and the parking lock cylinder (23) against the actuating force of the parking lock valve (PSV) in the direction of the further operating condition range of the parking lock valve (PSV).

8. The method of claim 1, further comprising:
determining an engagement time of the parking lock device (21) during the demand to engage the parking lock device (21) from the disengaged operating condition of the parking lock device (21); and
detecting a fault in the parking lock valve (PSV) when the engagement time is greater than a defined time period.

9. The method of claim 1, further comprising:
monitoring a parking lock sensor to determine an operating condition of the parking lock device (21) during the demand to engage the parking lock device (21); and
detecting a malfunction of the parking lock valve (PSV) when the monitored operating condition changes in the direction of the disengaged operating condition of the parking lock device (21).

10. The method of claim 1, further comprising actuating the positioning valve (POSV) by applying the maximum pilot pressure (p_EDS3) of the pilot control at the positioning valve (POSV) and upon detection of a fault in a pressure regulator (EDS3), in which the pilot pressure (p_EDS3) of the pilot control of the positioning valve (POSV) is adjustable by applying a further pilot pressure (p_EDS8) against the pilot pressure (p_EDS3) of the pilot control in the direction of a further operating condition range.

11. The method of claim 1, further comprising:
holding the parking lock device (21) in the disengaged operating condition of the parking lock device (21) via a stop device (27) during a demand to disengage the parking lock device (21); and
deactivating the stop device (27) during a demand to engage the parking lock device (21).

12. The method of claim 11, further comprising, upon detection of a malfunction of the stop device (27), adjusting the main pressure (p_sys) to or holding the main pressure (p_sys) above a pressure level greater than a threshold at which the parking lock device (21) is transferrable into or held in the disengaged operating condition of the parking lock device (21) with the main pressure (p_sys).

13. The method of claim 1, further comprising:
continuously ascertaining the main pressure (p_sys); and
during operating condition progressions of the hydraulic system (1) in which the main pressure (p_sys) increases from a pressure level of at least approximately zero in the direction of a pressure level at which the parking lock device (21) is held in the disengaged operating condition of the parking lock device (21) by the main pressure (p_sys), actuating the parking lock valve (PSV) and the positioning valve (POSV) to an extent required to pressurize the pressure chamber (22) of the parking lock cylinder (23) with the main pressure (p_sys) during a demand to disengage the parking lock device (21) or to hold the parking lock device (21) in the disengaged operating condition of the parking lock device (21).

14. The method of claim 13, wherein actuating the parking lock valve (PSV) and the positioning valve (POSV) as required for pressurizing the pressure chamber (22) of the parking lock cylinder (23) with main pressure (p_sys) does not occur or is interrupted during a demand to pressurize further hydraulic consumers with the main pressure (p_sys), the supply of which with main pressure (p_sys) is assigned a higher priority than pressurizing the pressure chamber (22) of the parking lock device (21) with main pressure (p_sys).

15. The method of claim 1, further comprising:
monitoring the operating conditions of pressure regulators (EDS3, EDS4) provided for adjusting the pilot pressure (p_EDS3) of the pilot control of the positioning valve (POSV) and the pilot pressure (p_EDS4) of the parking lock valve (PSV);
starting a time monitoring upon ascertainment of operating conditions of the pressure regulators (EDS3, EDS4) which allow for a drop of the pressure in the pressure chamber (22) of the parking lock cylinder (23) to a pressure level at which the parking lock device (21) is transferrable into an engaged operating condition of the parking lock device (21) and during a demand to disengage the parking lock device; and
transferring each of the pressure regulators (EDS3, EDS4) into an operating condition in which the pressure in the pressure chamber (22) is guided to a pressure level at which the parking lock device (21) transitions into or is held in the disengaged operating condition of the parking lock device (21) when, after a defined time period has lapsed, the pressure regulators (EDS3, EDS4) are each in the operating condition which allows for the drop of the pressure in the pressure chamber (22) of the parking lock cylinder (23) to the pressure level at which the parking lock device (21) is transferrable into the engaged operating condition of the parking lock device (21).

16. A method for operating a parking lock device (21) with a hydraulic system (1) that includes a positioning valve (POSV) pilot-controllable against an actuating force at the positioning valve (POSV), a parking lock valve (PSV) pilot-controllable against an actuating force at the parking lock valve (PSV), and a pressure chamber (22) of a parking lock cylinder (23), the method comprising:
during a demand to engage the parking lock device (21) from a disengaged operating condition of the parking lock device (21),
applying a pilot pressure (p_EDS4) at the parking lock valve (PSV) or applying both the pilot pressure (p_EDS4) and a main pressure (p_sys) at the parking lock valve (PSV) via the positioning valve (POSV),
guiding each of the pilot pressure (p_EDS4) and the main pressure (p_sys) to defined pressure levels at which the parking lock valve (PSV) is transferrable into a further operating condition range of the parking lock valve (PSV) by the actuating force at the parking lock valve (PSV) against the pilot pressure (p_EDS4) and against a pressure between the parking lock valve (PSV) and the parking lock cylinder (23), and connecting the pressure chamber (22) to a non-pressurized area (24) via the parking lock valve (PSV) in the further operating condition range of the parking lock valve (PSV) to engage the parking lock device (21).

\* \* \* \* \*